Figure 1A:
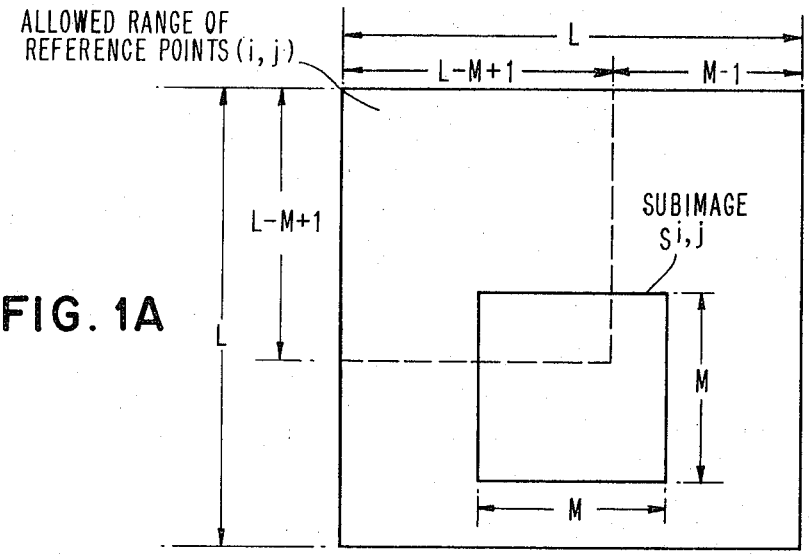
Figure 1B:
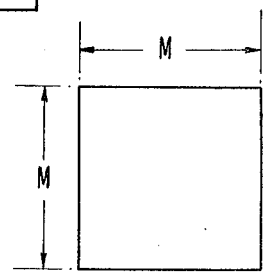
Figure 2:
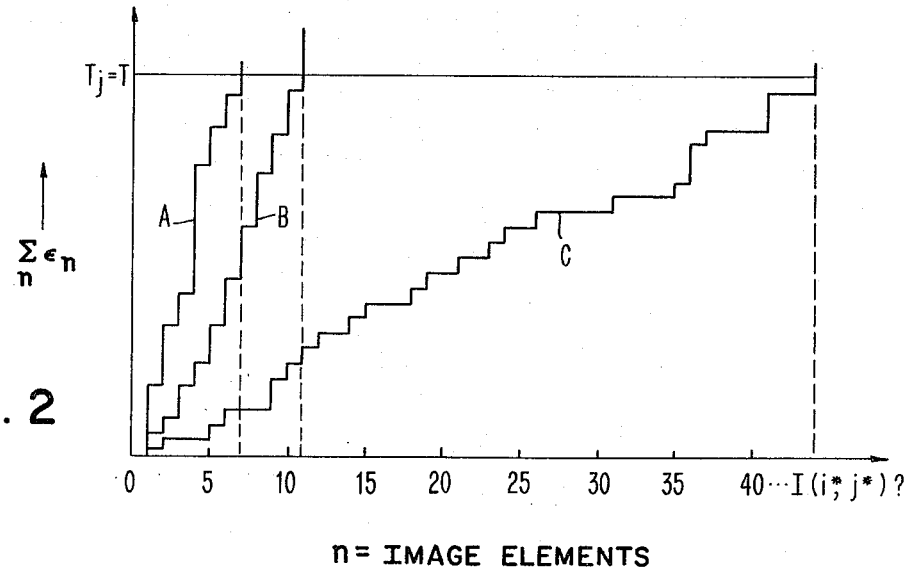
Figure 3:
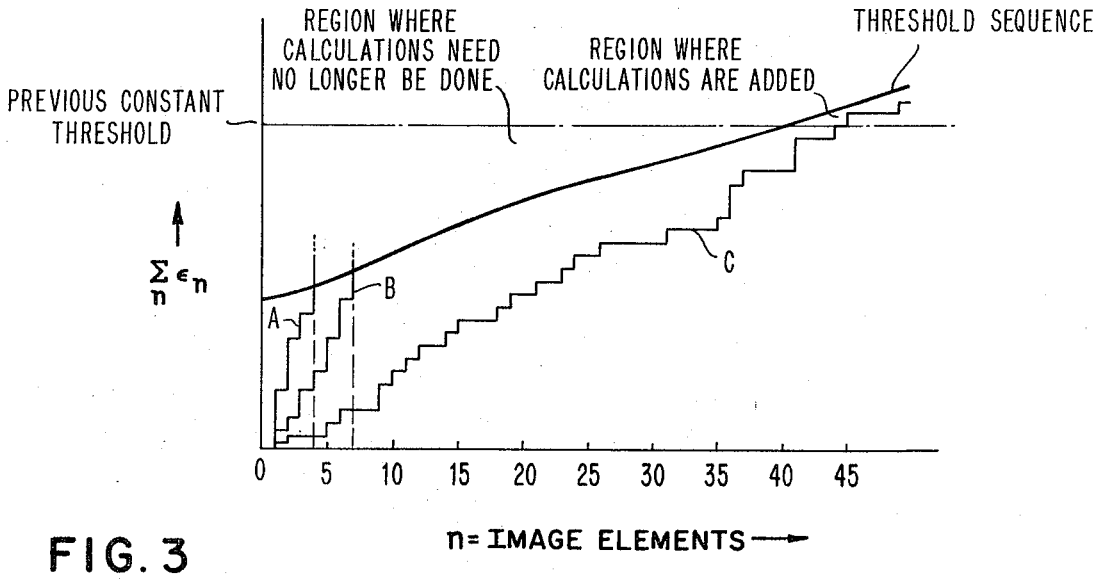
Figure 4:
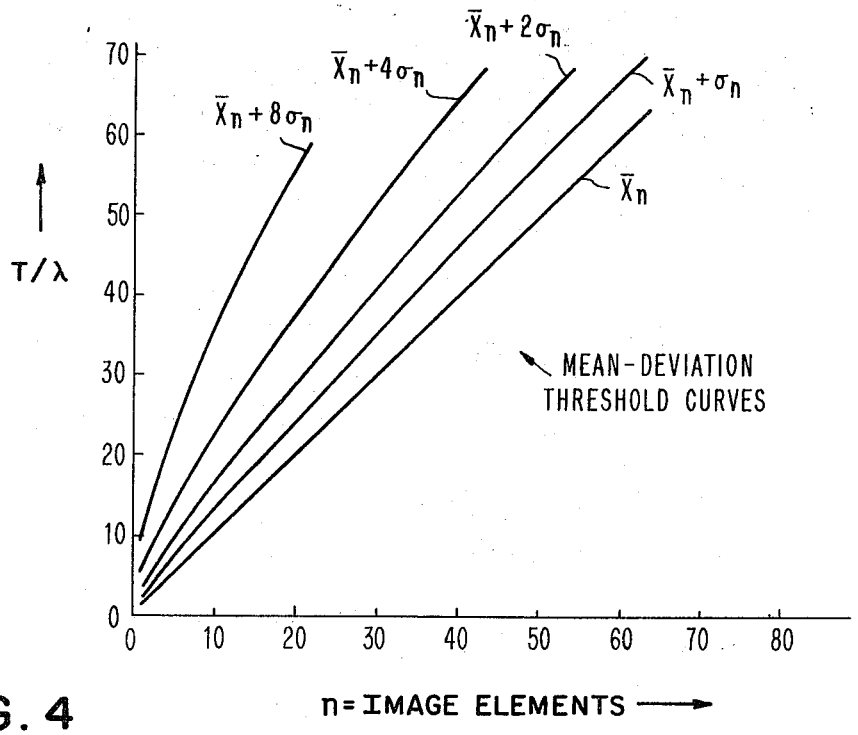
Figure 5:
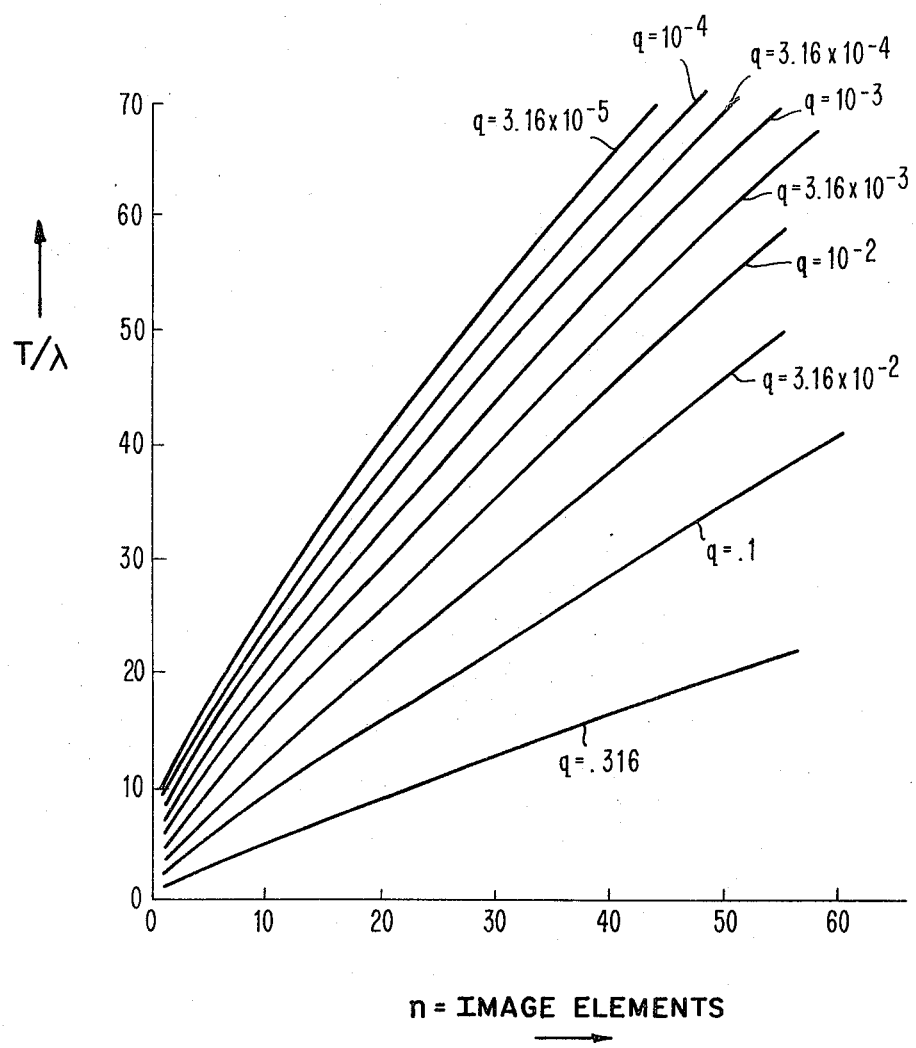
Figures 6, 6A:
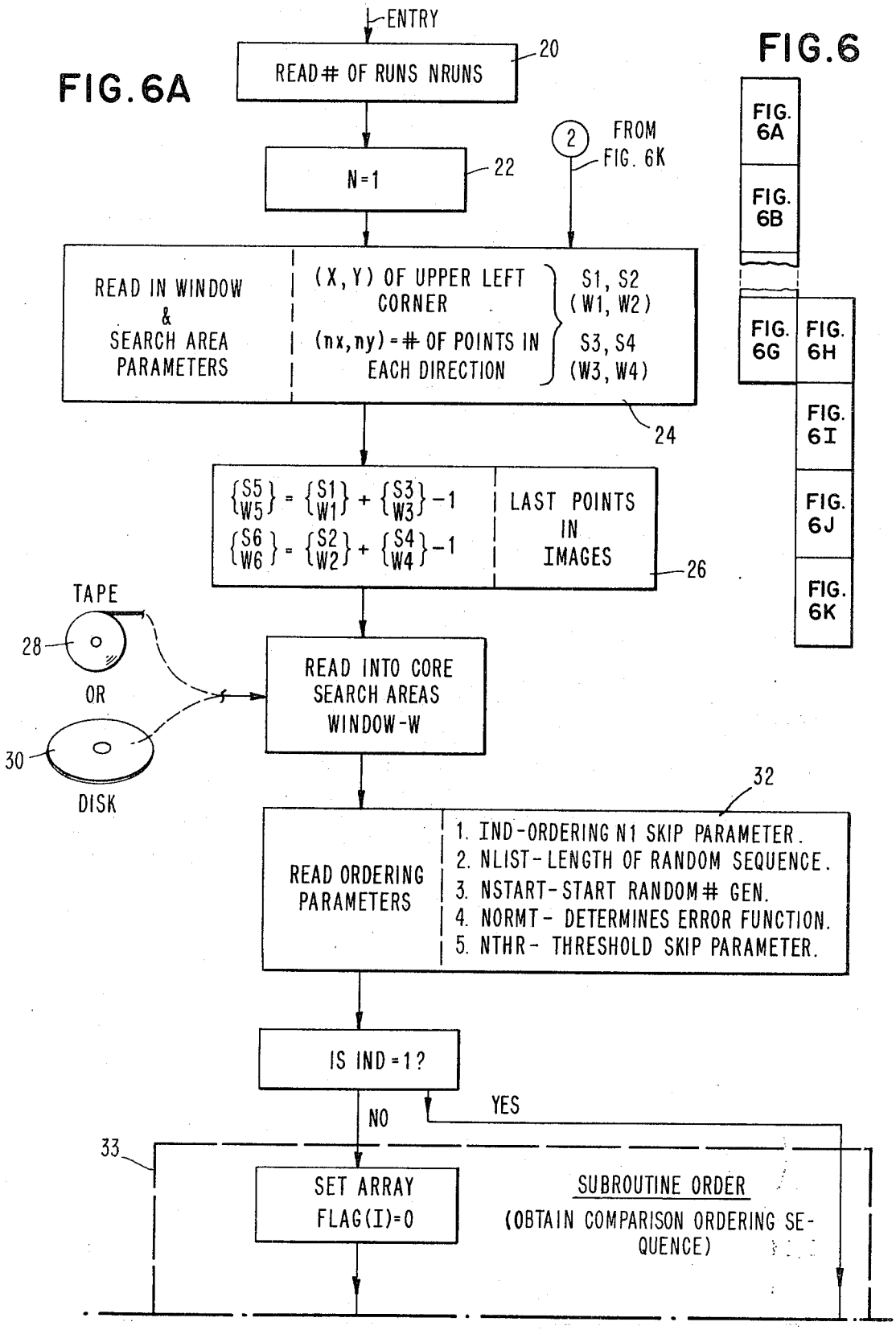
Figure 6B:
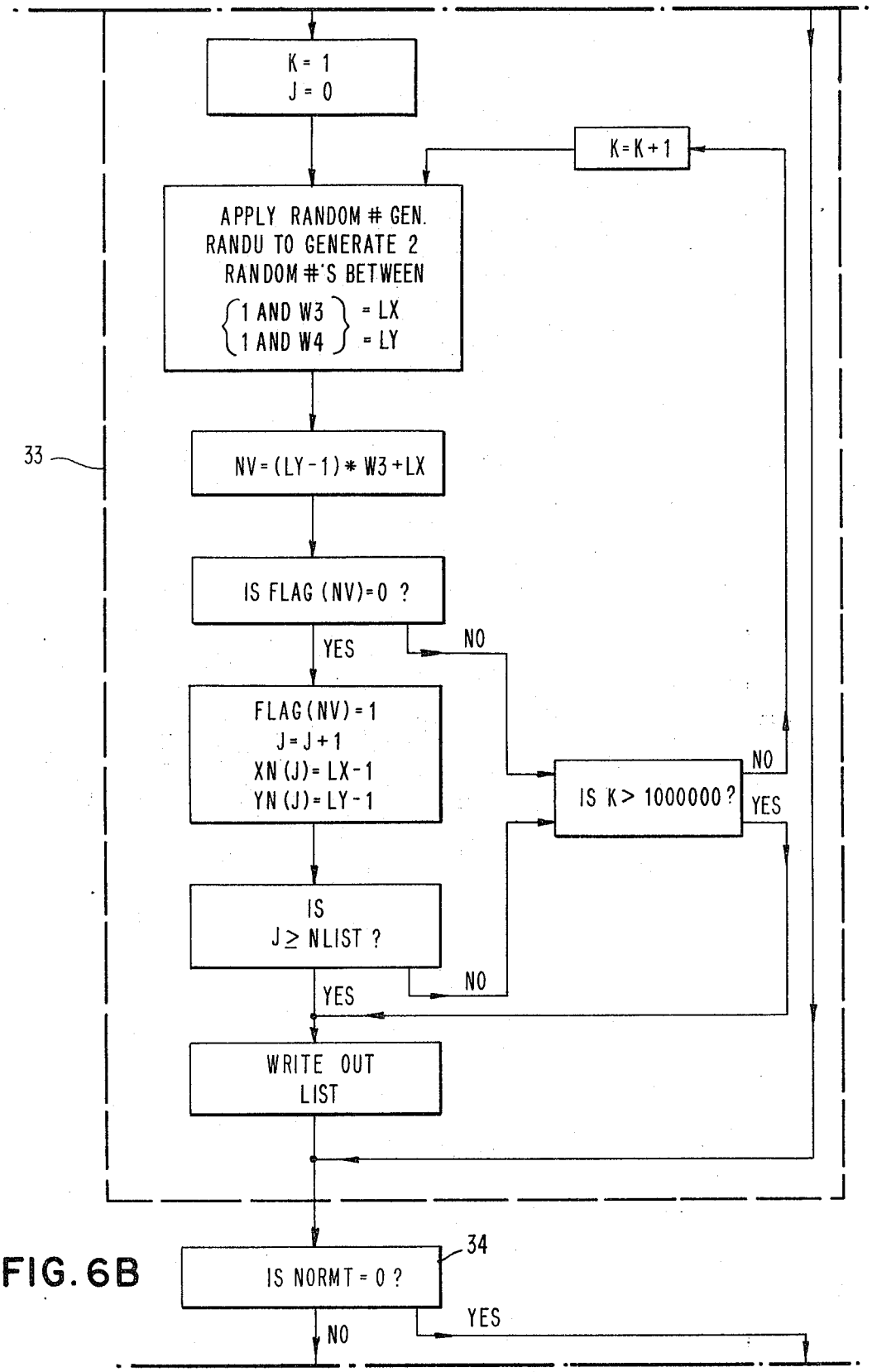
Figure 6C:
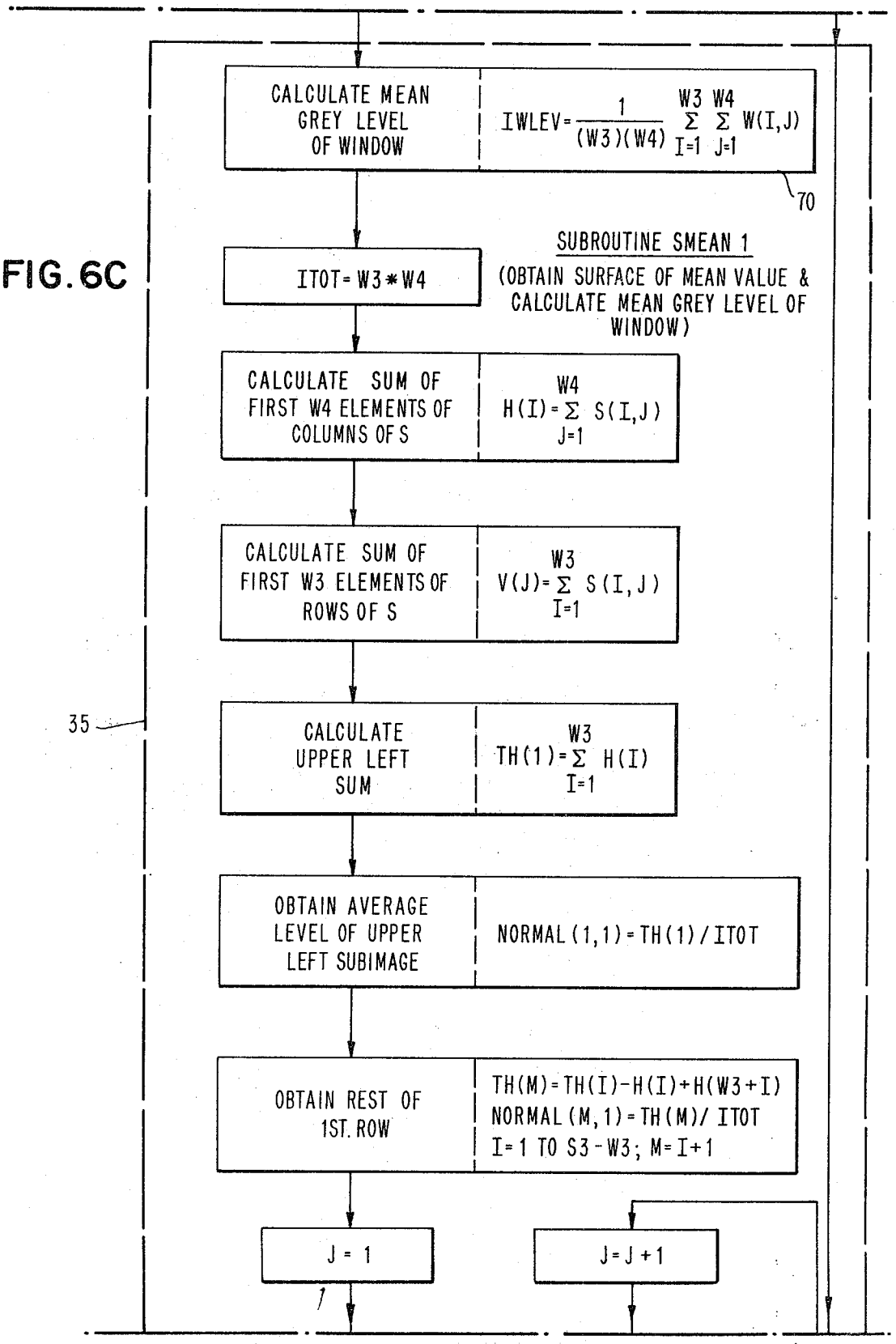
Figure 6D:
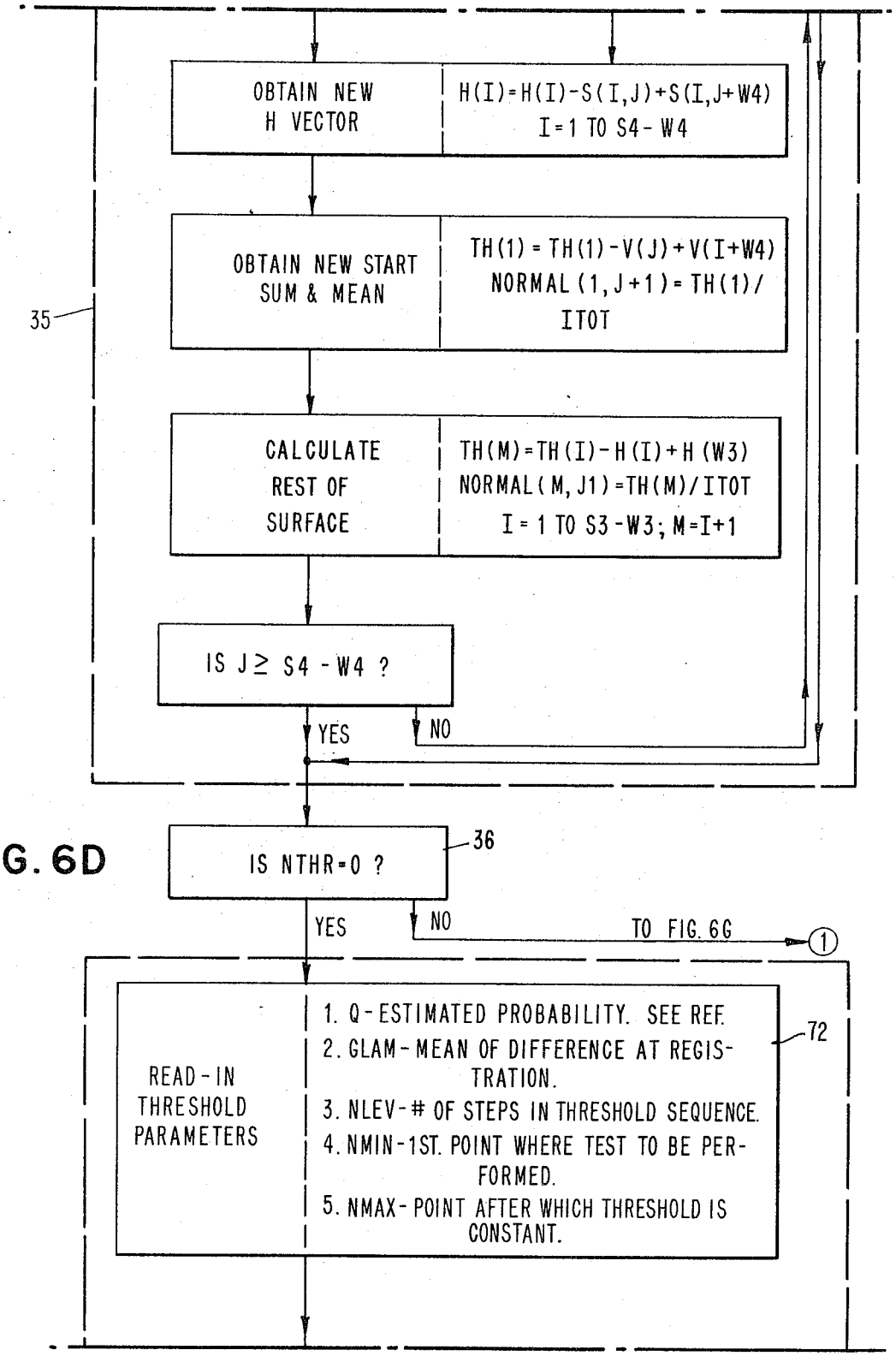
Figure 6E:
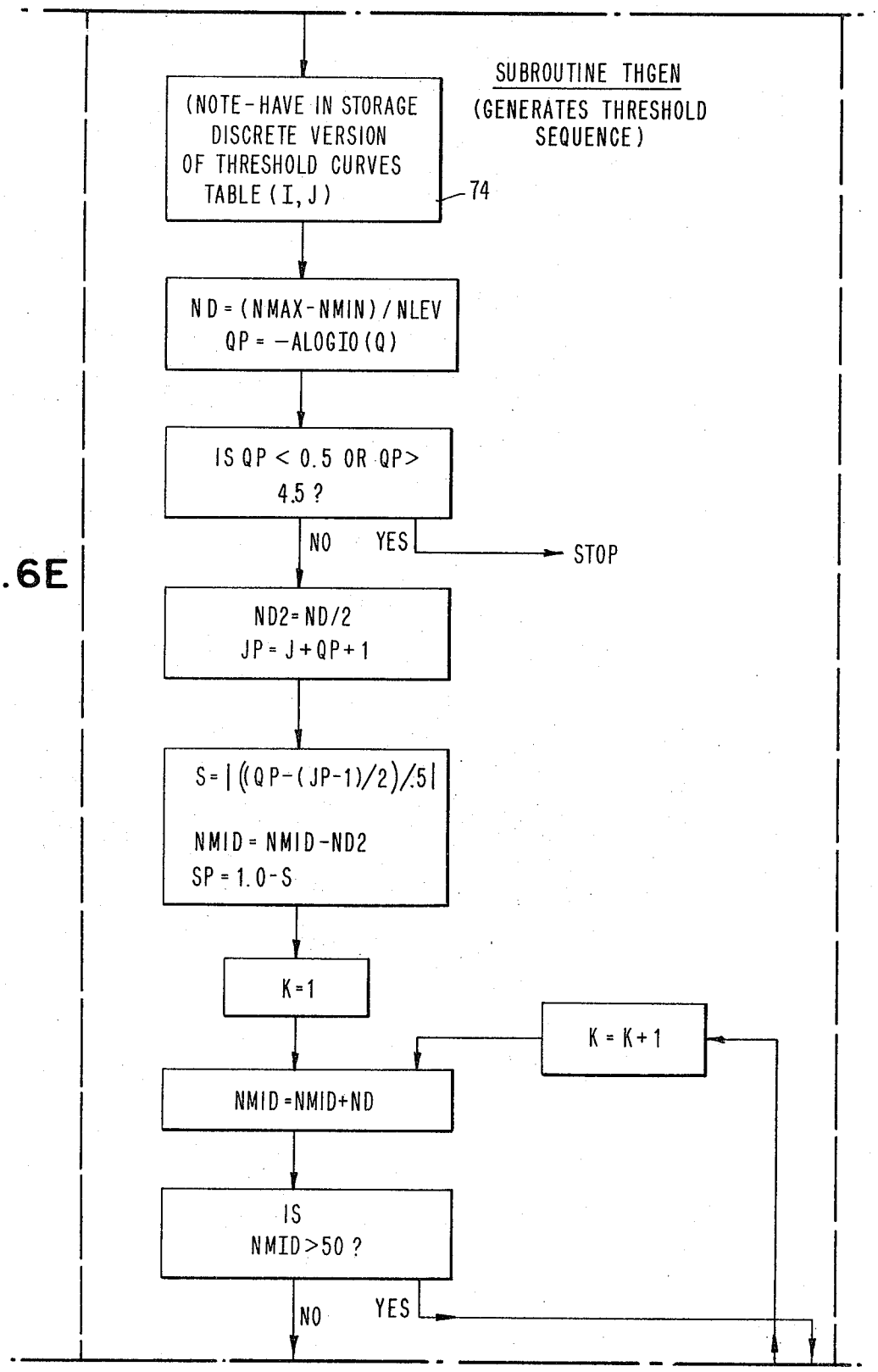
Figure 6F:
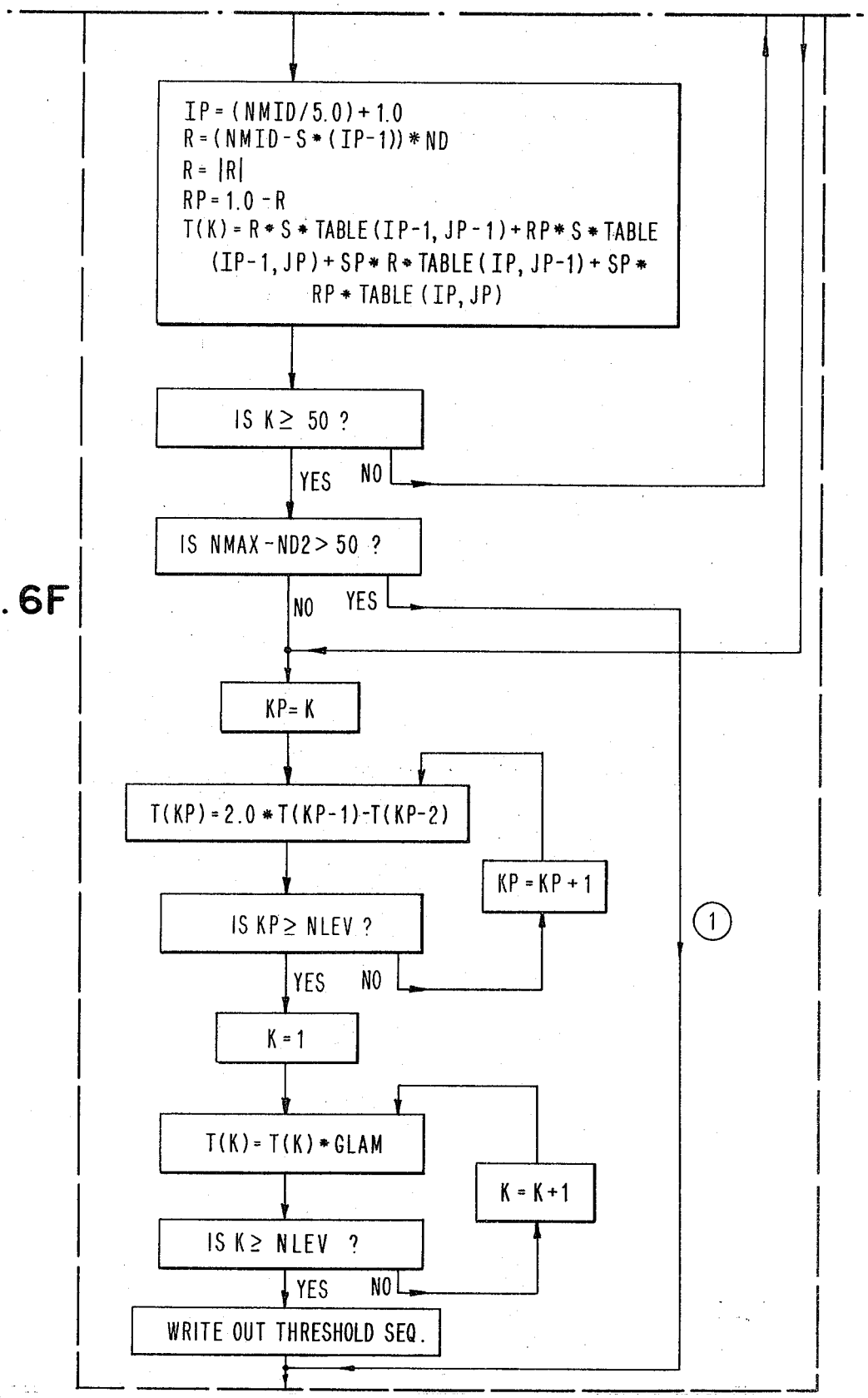
Figure 6G:
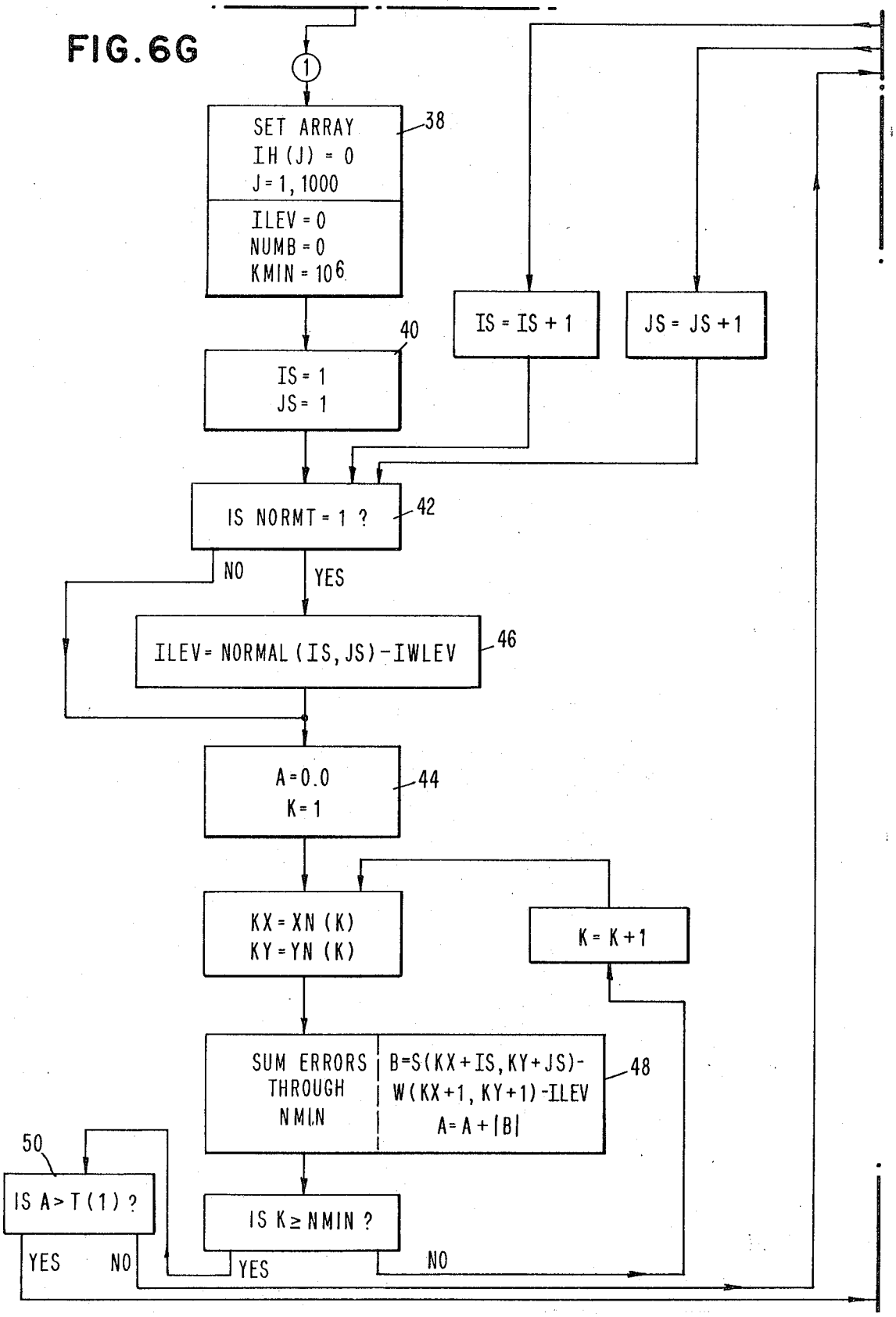
Figure 6H:
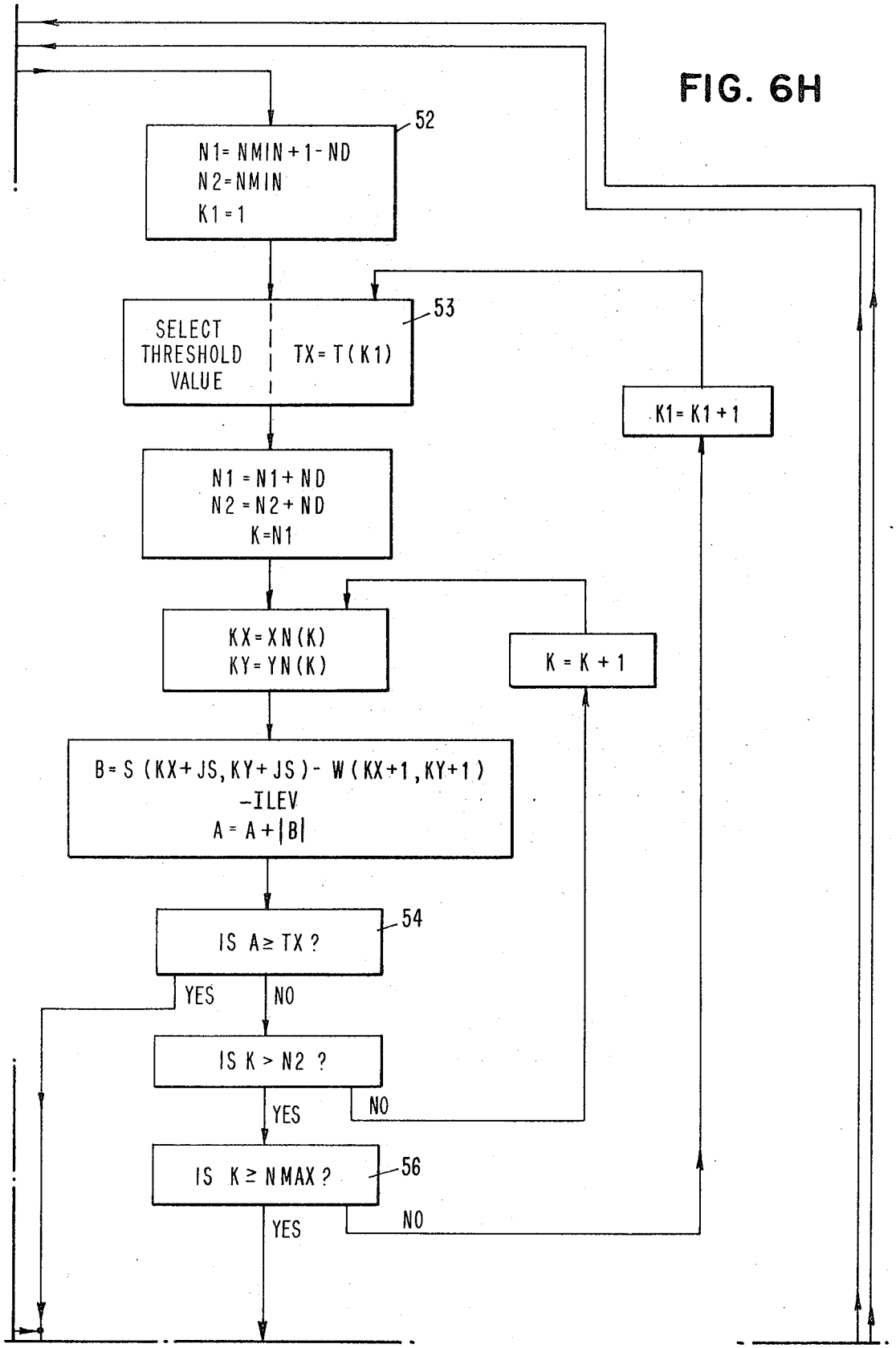
Figure 6I:
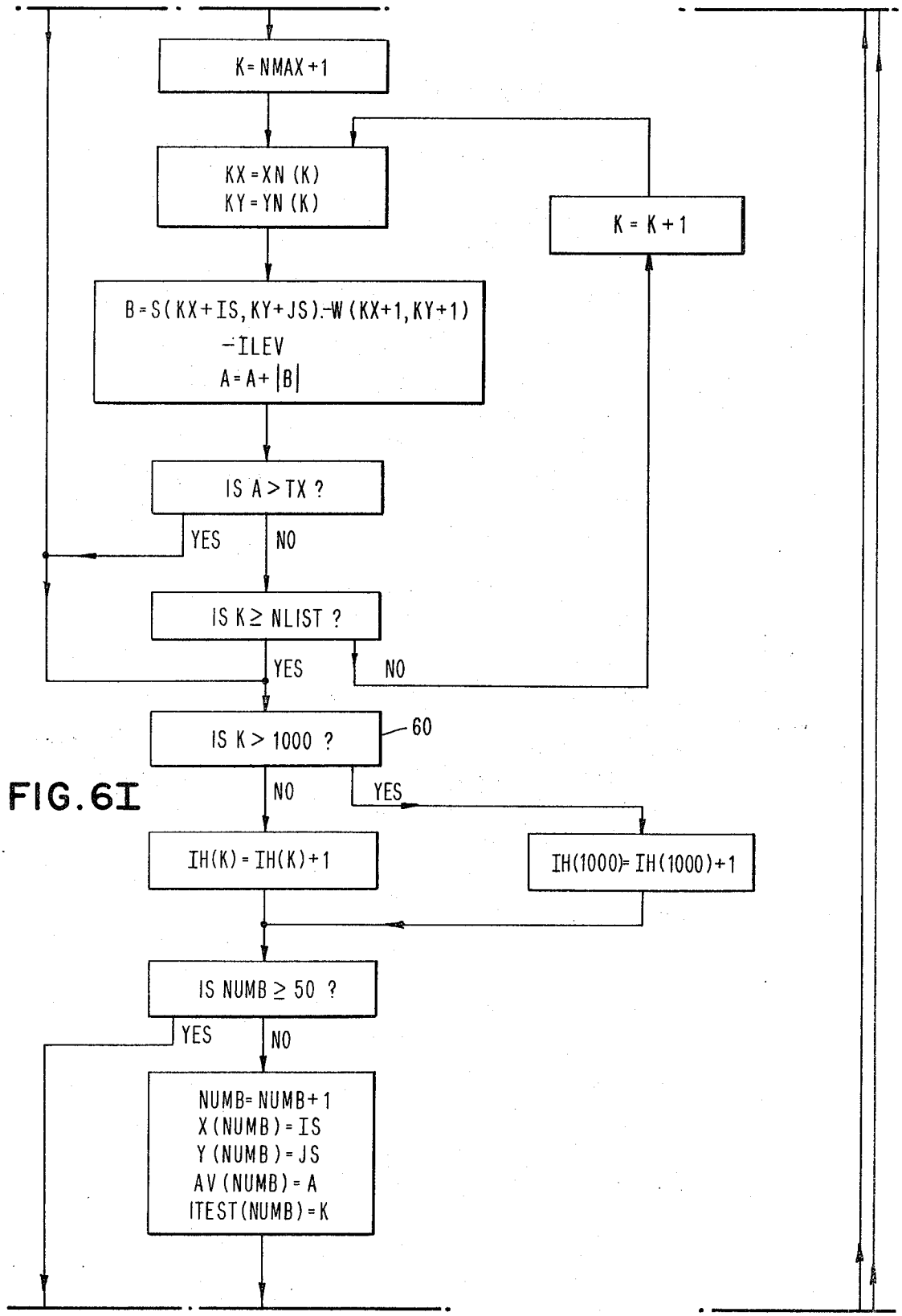
Figure 6J:
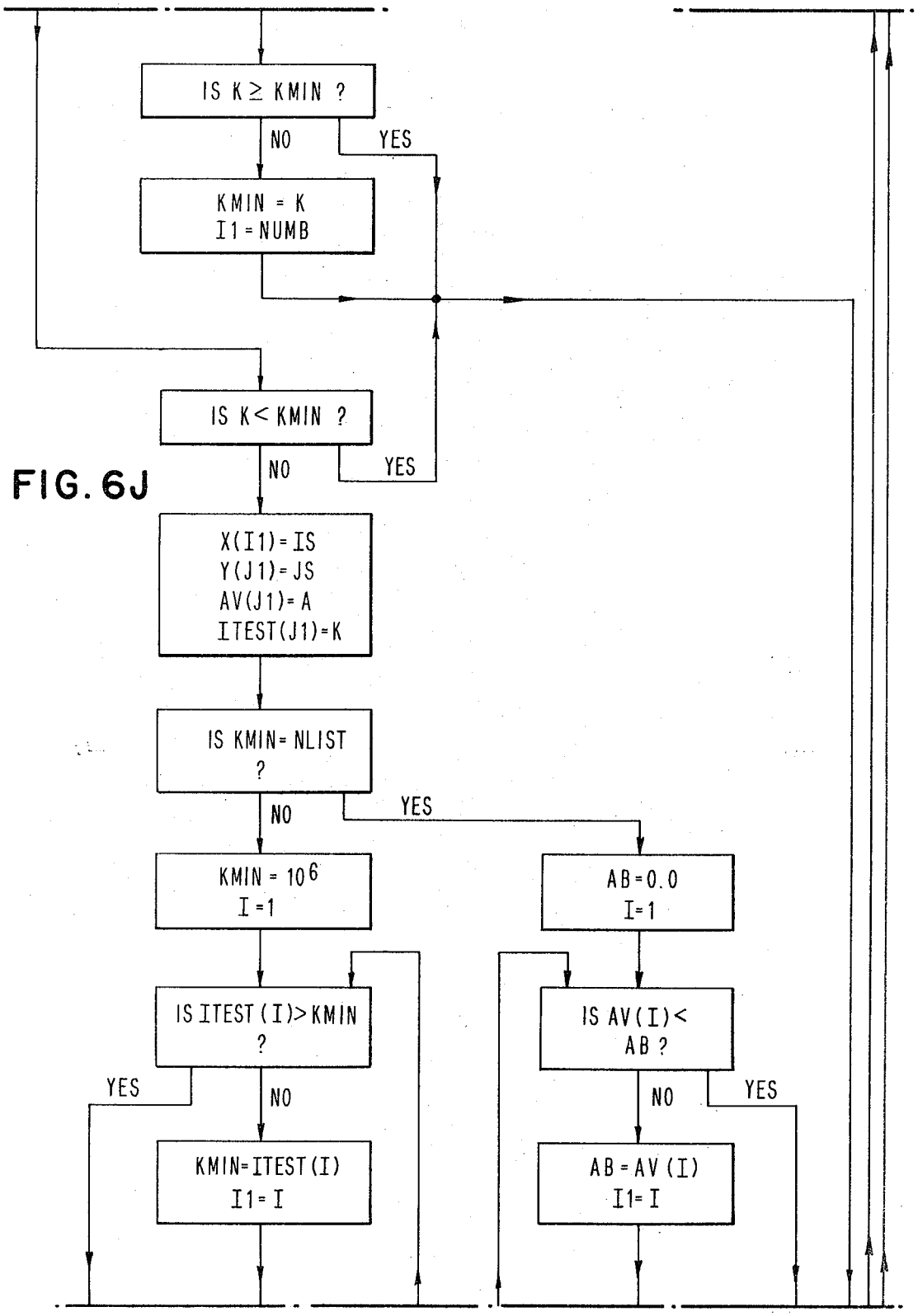
Figure 6K:
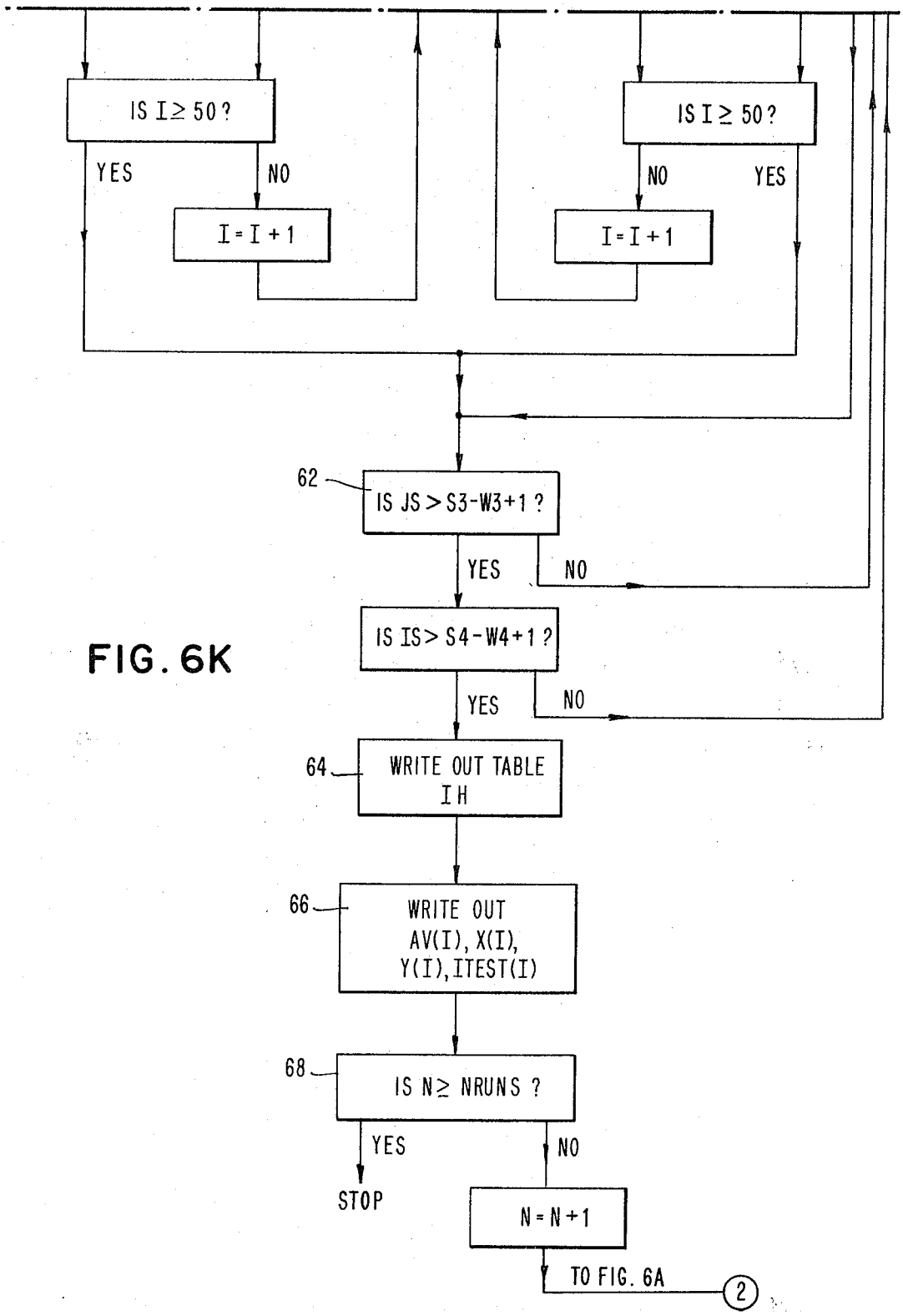

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 7, 1975

930 O.G. 115

T930,002

AUTOMATIC PROCESS FAST DIGITAL IMAGE REGISTRATION

Daniel I. Barnea, Tel Aviv, Israel, and Harvey F. Silverman, Mohegan Lake, N.Y., assignors to International Business Machines Corporation, Armonk, N.Y.

Continuation of abandoned application Ser. No. 263,482, June 16, 1972. This application Dec. 6, 1973, Ser. No. 422,503

Int. Cl. G06f *15/20*

U.S. Cl. 444—1

14 Sheets Drawing. 28 Pages Specification

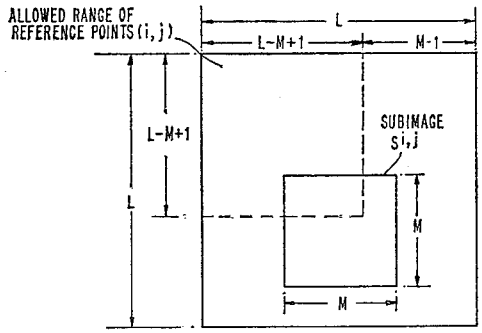

SEARCH AREA - S

This is an automatic process for the detection of local similarity between two structured data sets in order to achieve image registration. A class of sequential similarity detection processes for effecting image registration are disclosed. These processes determine the best mapping of a selected window area of one of the data sets onto the other data set. Reference points for the mapping are selected sequentially and for each reference point selected an error function is computed to determine whether the window correlates with the search area at the selected reference point. Correlation is determined by comparing the error function to a threshold sequence and terminating the process for a particular reference point when the error value exceeds the threshold value.

AUTOMATIC PROCESS FAST DIGITAL IMAGE REGISTRATION

Original Filed June 16, 1972 14 Sheets-Sheet 1

AUTOMATIC PROCESS FAST DIGITAL IMAGE REGISTRATION

Original Filed June 16, 1972 14 Sheets-Sheet 4

AUTOMATIC PROCESS FAST DIGITAL IMAGE REGISTRATION

Original Filed June 16, 1972 14 Sheets-Sheet 10